United States Patent
Roundy et al.

(10) Patent No.: US 7,260,984 B2
(45) Date of Patent: Aug. 28, 2007

(54) POWER GENERATION UTILIZING TIRE PRESSURE CHANGES

(75) Inventors: Shad Roundy, Concord, CA (US); Janusz Bryzek, Fremont, CA (US); Curtis Ray, Alamo, CA (US); Michael Malaga, San Francisco, CA (US); David L. Brown, Union, KY (US)

(73) Assignee: LV Sensors, Inc., Emeryville, CA (US)

( * ) Notice: Subject to any disclaimer, the term of this patent is extended or adjusted under 35 U.S.C. 154(b) by 2 days.

(21) Appl. No.: 11/245,485

(22) Filed: Oct. 5, 2005

(65) Prior Publication Data

US 2007/0074566 A1 Apr. 5, 2007

(51) Int. Cl.
B60C 23/02 (2006.01)
(52) U.S. Cl. .................................... 73/146.5
(58) Field of Classification Search .............. 73/146, 73/146.5
See application file for complete search history.

(56) References Cited

U.S. PATENT DOCUMENTS

| | | | | |
|---|---|---|---|---|
| 5,585,571 | A | 12/1996 | Lonsdale et al. | 73/862.325 |
| 5,703,474 | A | 12/1997 | Smalser | 323/299 |
| 5,801,475 | A | 9/1998 | Kimura | 310/319 |
| 6,175,302 | B1 | 1/2001 | Huang | 340/442 |
| 6,407,484 | B1 | 6/2002 | Oliver et al. | 310/339 |
| 6,528,898 | B1 | 3/2003 | Ikura et al. | 290/1 |
| 6,725,713 | B2 * | 4/2004 | Adamson et al. | 73/146.5 |
| 6,739,195 | B2 | 5/2004 | Evans et al. | 73/598 |
| 6,768,246 | B2 | 7/2004 | Pelrine et al. | 310/339 |
| 6,771,007 | B2 | 8/2004 | Tanielian | 310/339 |
| 6,807,523 | B1 | 10/2004 | Wensink et al. | 703/27 |
| 6,807,853 | B2 * | 10/2004 | Adamson et al. | 73/146 |
| 6,847,126 | B2 | 1/2005 | Adamson et al. | 290/1 |
| 6,992,423 | B2 | 1/2006 | Mancosu et al. | |
| 2003/0061873 | A1 * | 4/2003 | Lin | 73/146.5 |
| 2003/0209063 | A1 * | 11/2003 | Adamson et al. | 73/146 |
| 2003/0209064 | A1 * | 11/2003 | Adamson et al. | 73/146 |
| 2004/0100100 | A1 | 5/2004 | Wilson | 290/1 |
| 2004/0211250 | A1 | 10/2004 | Adamson et al. | 73/146 |

(Continued)

OTHER PUBLICATIONS

"Pizoelectric Energy Harvesting for BioMEMS Applications", Smart Structures and Materials 2001: Industrial and Commercial Applications of Smart Structures Technologies, Anna-Maria McGowan (Ed.), Proceedings, SPIE vol. 4322 (2001), p. 429.

(Continued)

*Primary Examiner*—Andre J. Allen
(74) *Attorney, Agent, or Firm*—Lumen Intellectual Property Services, Inc.

(57) ABSTRACT

A method of powering one or more electronic devices in a tire monitoring system using a tire pressure based energy scavenger is provided. With this method, a tire is rotated on a surface to generate pressure changes within the tire. These pressure changes are then converted into electrical energy with a transducer and the energy is stored. The electrical energy or stored electrical energy can then be used to power one or more electronic devices in a tire monitoring system, such as a tire pressure sensor, temperature sensor, acceleration profile sensor, and/or a tire wear monitor. A tire monitoring system with a tire pressure based energy scavenger is also provided.

29 Claims, 13 Drawing Sheets

U.S. PATENT DOCUMENTS

| | | | |
|---|---|---|---|
| 2005/0134444 A1* | 6/2005 | Park et al. | 340/445 |
| 2005/0217361 A1* | 10/2005 | Yueh | 73/146 |
| 2005/0234613 A1* | 10/2005 | Brusarosco et al. | 701/29 |
| 2006/0022555 A1 | 2/2006 | Balasubramaniam et al. | |
| 2006/0243043 A1* | 11/2006 | Breed | 73/146 |

OTHER PUBLICATIONS

Meninger S, Mur-Miranda JO, Amirtharajah R, Chandrakasan AP, Lang JH, 2001. Vibration-to-Electric Energy Conversion. *IEEE Transactions on Very Large Scale Integration (VSLI) Systems*, vol. 9, No. 1, pp. 64-76.

Pelrine R, Kornbluth R, Eckerle J, Jeuck P, Oh S, Pei Q, Stanford S. 2001. Dielectric Elastomers: Generator Mode Fundamentals and Applications. *Proceedings of the SPIE (Electroactive Polymer Actuators and Devices) from Smart Structures and Materials Symposium 2001*, Mar. 4-8, Newport Beach, California.

Sterken T, Fiorini P, Baert K, Puers R, Borghs G. 2003. An electret-based electrostatic /splmu/-generator. *12th International Conference on Solid-State Sensors, Actuators, and Microsystems.* vol. 2, pp. 1291-1294.

S. Backhaus, E. Tward, M Petach "Traveling-wave thermoacoustic electric generator" Applied Physics Letters, Aug. 9, 2004, vol. 85 issue 6, pp. 1085-1087.

Roundy and Wright, "A Piezoelectric Vibration Based Generator for Wireless Electronics", Smart Materials and Structures, vol. 13, 2004, pp. 1131-1142.

Prasad et al., "Two-Port Electroacoustic Model of an Axisymmetric Piezoelectric Composite Plate", 43rd AIAA/ASME/ASCE/AHS/AHC Structures, Structural Dynamics, and Materials Conference 2002.

* cited by examiner

A

B

A

B

C

POWER GENERATION UTILIZING TIRE PRESSURE CHANGES

FIELD OF THE INVENTION

The present invention relates generally to power scavengers. More particularly, it relates to a system and method for scavenging or harvesting energy from pressure changes generated within a moving vehicle tire.

BACKGROUND

The concept of scavenging or harvesting energy from the environment has long been utilized in the form of wind, water, and solar energy. More recently, by means of suitable transducers, other forms of energy can also be gathered and transformed into electrical energy.

Various materials are used in energy harvesters. For example, transducers utilizing piezoelectric materials use the piezoelectric effect to affect the change between electrical energy and flexural or vibration changes, see, e.g., U.S. Pat. No. 6,771,007. Also available are pyroelectric transducers, which use temperature changes to effect the generation of electrical power, see, e.g., U.S. Pat. No. 6,528,898.

The use of piezoelectric transducers to generate electrical power from movement has been a goal in the defense industry where energy can be generated simply from walking, via a heel-strike transducer, to power man-portable electronic devices, see, e.g., U.S. Pat. No. 6,768,246. Such self-powered devices have also been proposed as motion detectors to send a signal when significant vibration occurs, see, e.g., U.S. Pat. No. 5,801,475. In the biomedical field, M. J. Ramsay et al. proposed using piezoelectric transducers to harvest energy from biological functions, in this case, fluctuations in blood pressure, to generate small amounts of electrical power, see, "Piezoelectric Energy Harvesting for Bio MEMS Applications", Smart Structures and Materials 2001: Industrial and Commercial Applications of Smart Structures Technologies, Anna-Maria McGowan (Ed.), Proceedings, SPIE Vol. 4332 (2001), p. 429.

In-tire electronics is another field where there has been much interest in energy scavenging and generation. Currently, tire monitoring devices are mounted within the wheel to monitor, for example, tire pressure, wheel imbalance, or tire wear. Powering these devices generally requires the use of batteries. The downside is that batteries have a restricted lifespan, add to the weight of the device, require additional wheel balancing, and do not operate well at the temperature extremes (−40° C. and 125° C.) encountered in this application.

Efforts have been made to investigate alternative methods of providing electrical power to these tire monitoring devices. One method, which is sometimes referred to as the passive approach, uses devices such as SAW filters. The filters are positioned in or on the wheel so that they can be activated by an external electromagnetic field and can then respond with information on the status of the wheel/tire, see, e.g., U.S. Pat. No. 5,585,571. Another method involves scavenging energy from the tire or wheel, in the form of vibrations or flexing of the tire wall. For example, U.S. Pat. No. 6,407,484 makes use of the motion of the tire; U.S. Patent Application Publication No. 20040100100 discloses a coil and magnet device attached to the wheel and the tire inner wall; and U.S. Pat. No. 6,847,126 harvests static electricity built up during the motion of the tire.

In addition, various designs and configurations for scavenging energy from the motion of the wheel or tire have been proposed, see, e.g., U.S. Pat. Nos. 6,725,713, 6,807,523, and U.S. Patent Application Publication No. 20040211250. These consist primarily of piezoelectric structures embedded within the tire, which are flexed when the tire rotates. U.S. Pat. No. 6,175,302 discloses mounting such a piezoelectric structure separately in a tire valve. As is known in the art, the electrical energy thus produced can be stored by a variety of means, see, e.g., U.S. Pat. No. 5,703,474.

As one skilled in the art will appreciate, there is a continuing need for better, more cost-effective power scavengers for use in tire monitoring devices. Accordingly, there is a need in the art to develop new, efficient power scavengers for use in these devices.

SUMMARY OF THE INVENTION

The present invention provides a method of powering one or more electronic devices in a tire monitoring system. With this method, pressure changes within a tire that are generated by rotation of the tire are converted to electrical energy using a transducer. These changes may be, e.g., random or cyclic pressure changes. Preferably, the generated pressure changes are changes in gas pressure. The electrical energy may then be used to power the electronic devices. In a preferred embodiment, the electrical energy is stored either in parallel with powering the electronic devices or prior to powering the electronic devices. Various transducers are suitable for implementing this invention, including but not limited to piezoelectric transducers, variable capacitors, mechanical bellows, or diaphragms with a coil and fixed magnet. In addition, various storage devices may be used to store the electrical energy, including but not limited to rechargeable batteries, capacitors, and supercapacitors. A number of electronic devices may be powered by the transducer, including but not limited to pressure sensors, temperature sensors, acceleration profile sensors, and tire wear monitors.

The present invention also provides a tire monitoring system with a pressure-based energy scavenger. The tire monitoring system includes one or more electronic devices and a pressure transducer. Preferably, the tire monitoring system also includes a storage device for storing electrical energy converted by the pressure transducer.

BRIEF DESCRIPTION OF THE FIGURES

The present invention together with its objectives and advantages will be understood by reading the following description in conjunction with the drawings, in which.

DETAILED DESCRIPTION OF THE INVENTION

Figure 1:
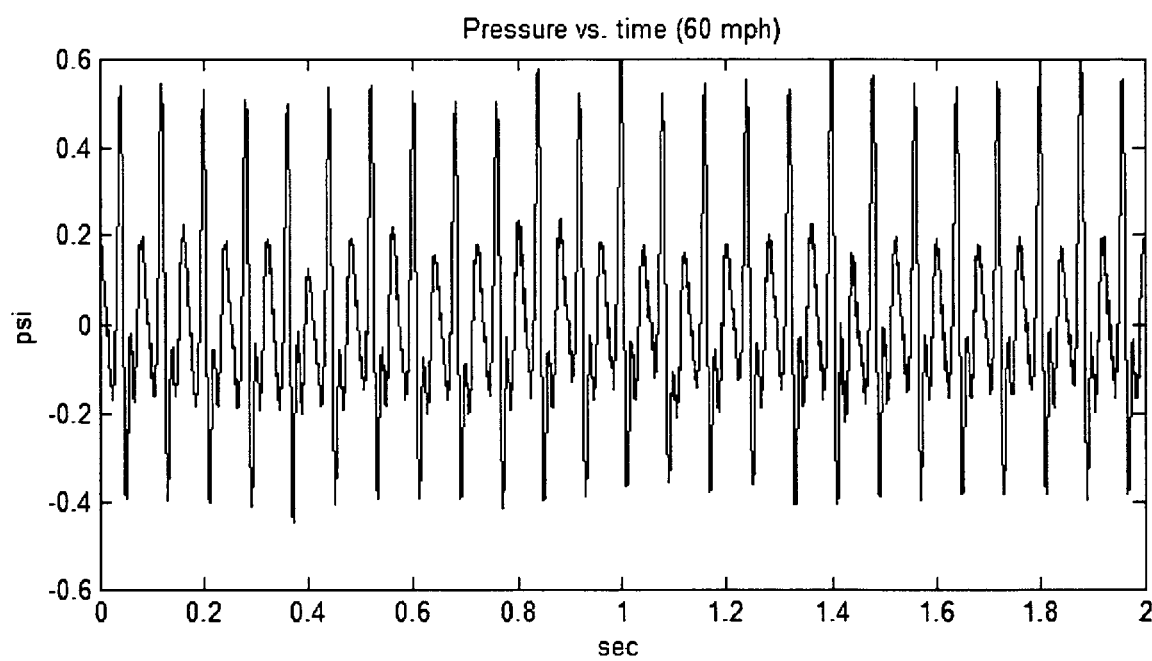
FIG. 1 shows changes in pressure within a tire during rotation of the tire according to the invention.
Figure 2:
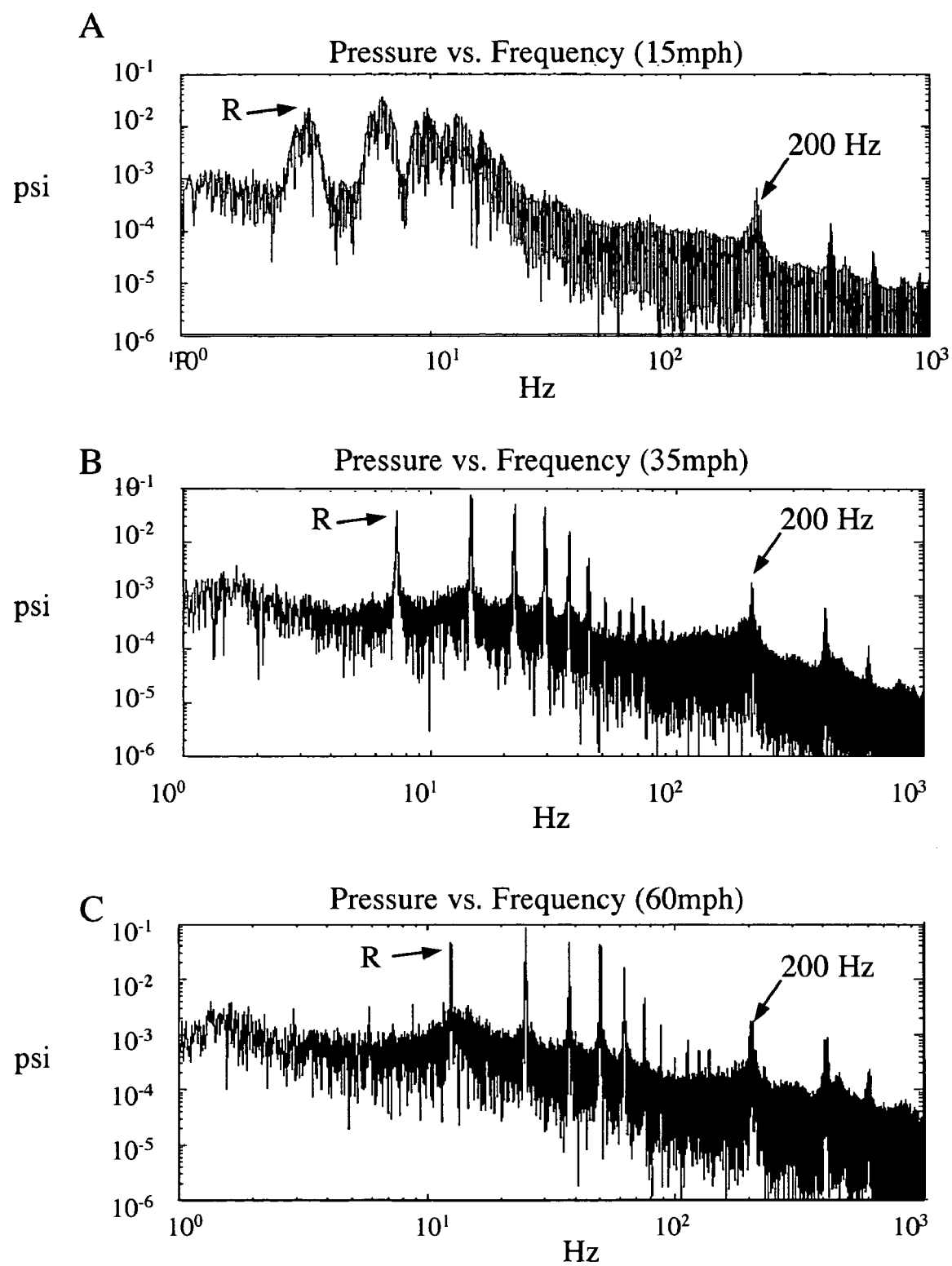
FIG. 2 shows plots of pressure vs. frequency in a tire during motion of a vehicle at (A) 15 mph, (B) 35 mph and (C) 60 mph according to the invention.
Figure 3:
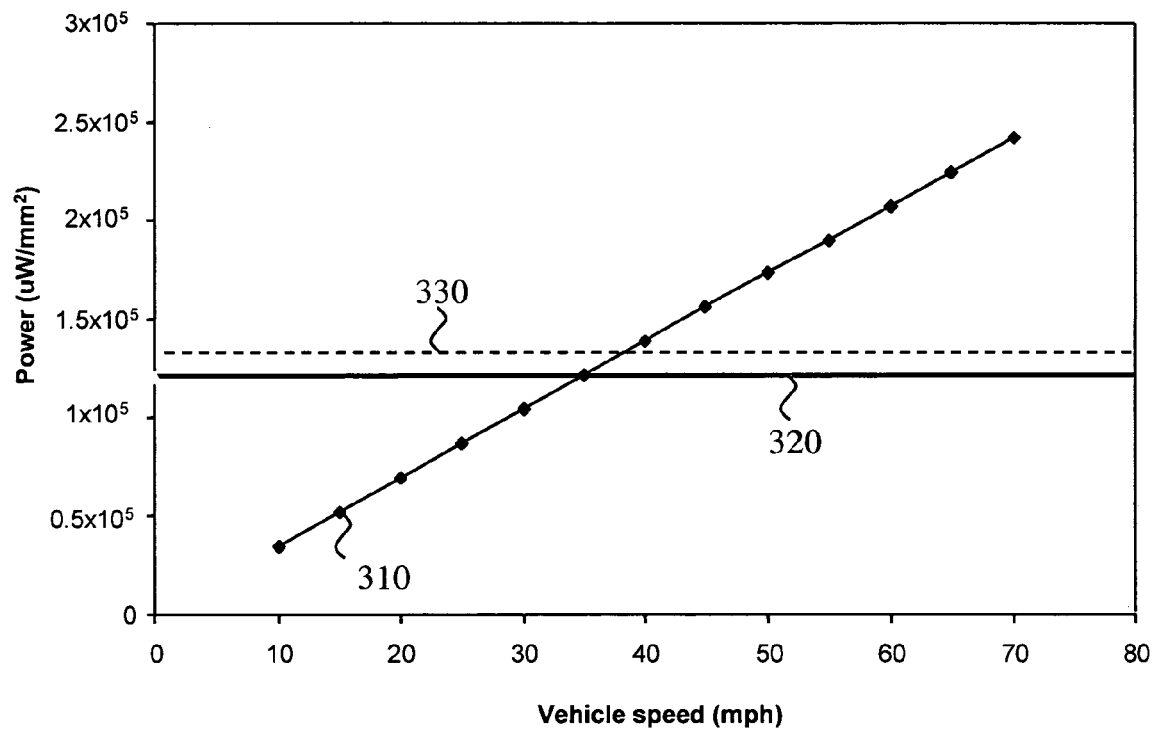
FIG. 3 shows power that is available from pressure changes generated in a rotating tire according to the invention.

The present invention provides a power scavenger that utilizes pressure changes generated within a rotating tire to produce electrical energy suitable for powering electronics, for example a tire monitoring system. Preferably, the pressure changes are gas pressure changes within the tire. An example of such pressure changes is shown in FIG. 1. In this example, the tire is mounted on a wheel in a vehicle moving at 60 mph. Using spectrum analysis, the pressure changes shown in FIG. 1 can be resolved into different frequencies with different amplitudes. Exemplary plots of amplitude vs frequency of pressure changes generated within a rotating tire are shown in FIG. 2 for tires mounted on wheels in vehicles moving (A) 15 mph, (B) 35 mph and (C) 60 mph. FIG. 2 shows that there are a number of amplitude peaks of frequencies of pressure changes generated within the rotating tire. Some of these peaks correspond to the rotating, or rolling, frequency (identified by R in FIG. 2) of the tire as well as its associated harmonics. These peaks depend on vehicle speed and tire size. In this example, at 15 mph the rolling frequency R is 3.15 Hz, with relevant harmonics at 6.3, 9.45 and 12.6 Hz; at 35 mph, the rolling frequency R is 7.3 Hz, with relevant harmonics at 14.6, 21.9, 29.2, 36.5, and 43.8 Hz; and at 60 mph, the rolling frequency R is 12.6 Hz, with relevant harmonics at 25.2, 37.8, 50.4, and 63.0 Hz. There is also a peak at about 200 Hz that is present in tires rotating at 15 mph, 35 mph, and 60 mph. The 200 Hz peak is thus independent of speed. The frequency of this speed-independent peak in a given tire will vary by about ±3.5%, or ±7 Hz due to temperature variation. The amplitude of this peak was experimentally determined to be of the order of 5 to 10 mpsi or a sound pressure level of 120 to 130 dB and is significant enough to produce a significant deflection of a membrane or diaphragm that in turn can drive a transducer. The power that is available from these two sources, i.e. the rolling frequency (black triangles 310) and the 200 Hz peak (solid black line 320) can be calculated and is shown in FIG. 3. As can be seen from FIG. 3, the average power that could be generated by transducing the 200 Hz frequency is approximately 120 mW/mm$^2$ transducer area. FIG. 3 also shows the average amount of power (138 mW/mm$^2$) that can be generated by transducing rolling frequencies (dashed black line 330).

Thus, this invention provides transducers that convert pressure changes generated within a rotating tire into electrical energy. In one embodiment of the invention, a transducer is provided that is designed to operate in a non-resonant mode, and can therefore operate over a wide band of frequencies. For example, a non-resonant transducer could operate from about 1 to about 100 Hz. This non-resonant transducer takes advantage of rolling frequencies and their associated harmonics, which vary with speed. In an alternative embodiment, a transducer is provided that is tuned to resonate at about 200 Hz, a frequency of pressure change that is generated independent of speed. As this speed-independent frequency changes with tire and rim diameter, a range of transducers tuned to the appropriate frequency to provide optimum power for a particular tire dimension is also provided. The speed-independent frequency generally falls between about 195 and about 240 Hz. For example, tire size 31,10.5,R15 has a speed-independent frequency of about 202 Hz; tire size 225,65,R16 has a speed-independent frequency of about 223 Hz; and tire size 250,50,R16 has a speed-independent frequency of about 232 Hz.

Piezoelectric Pressure Transducers

Figure 4:
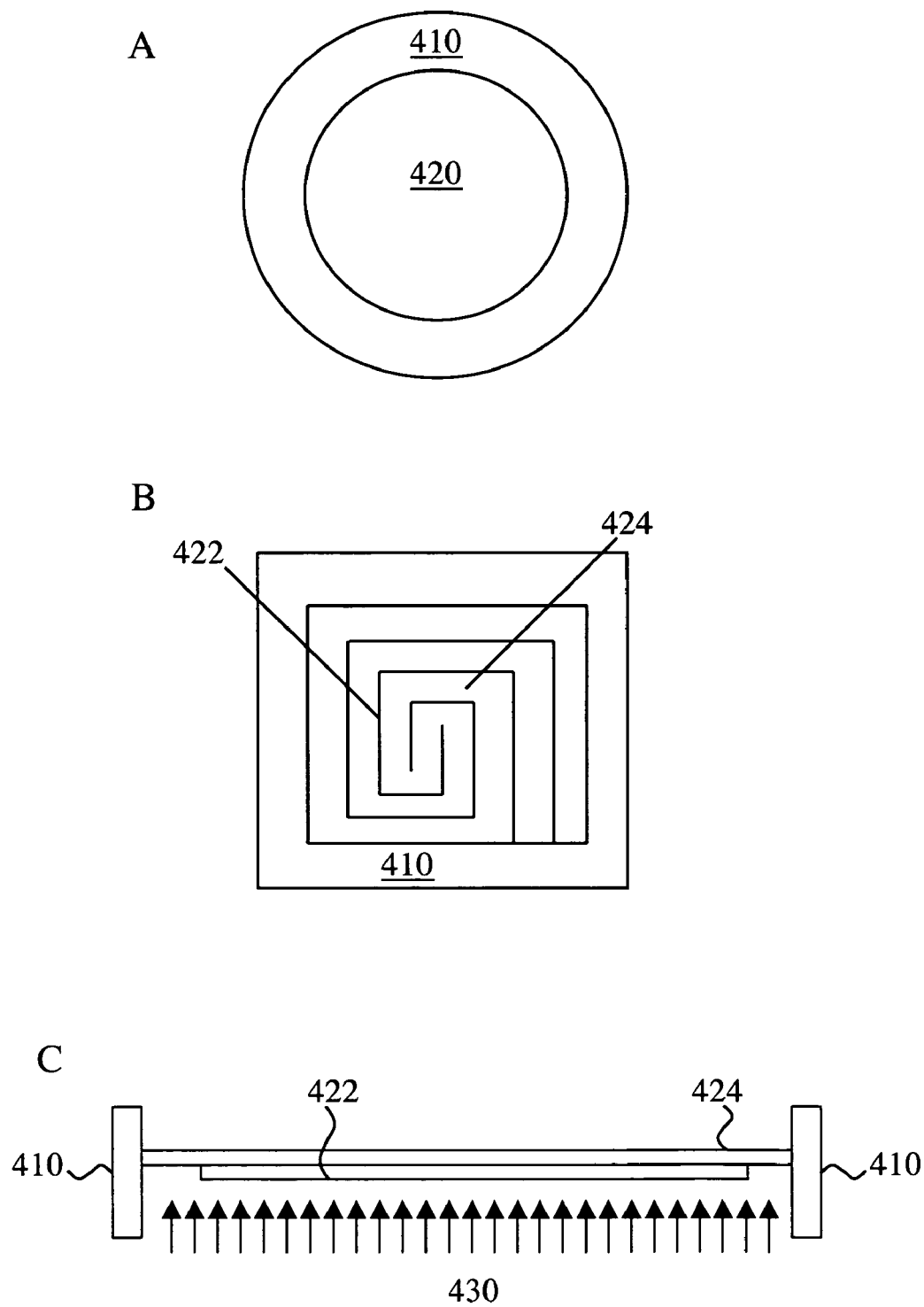
FIG. 4 shows examples of piezoelectric pressure transducers according to the present invention.

In one embodiment of the invention, the transducer is a piezoelectric transducer. In one aspect of this embodiment, the piezoelectric transducer is a circular diaphragm, or "buzzer"-style, transducer, a top view of which is shown in FIG. 4A, where 410 is a clamp and 420 is a diaphragm with piezoelectric material. A diaphragm with a square piece of piezoelectric material is also possible. Alternatively, the output of the transducer may be optimized to improve the available power by creating a spiral structure, which maximizes strain in the piezoelectric material. FIG. 4B shows a top view of a transducer configuration in which a spiral of piezoelectric material 422 is supported on a flexible diaphragm 424. As diaphragm 424 deforms from clamp 410 due to a pressure differential, the spiral design creates extensive strain along the length of the spiral. An alternative version of this approach to improving conversion efficiency is to fabricate a spiral, or interdigitated spirals, with a variable width designed to keep the stress constant along the length of the spiral (not shown). FIG. 4C shows a cross section of a piezoelectric transducer, with clamp 410, piezoelectric material 422 and diaphragm 424. An alternating pressure wave indicated by arrows 430 causes the diaphragm 424 and piezoelectric material 422 to deflect, resulting in a conversion of pressure changes into electrical energy.

Figure 5:
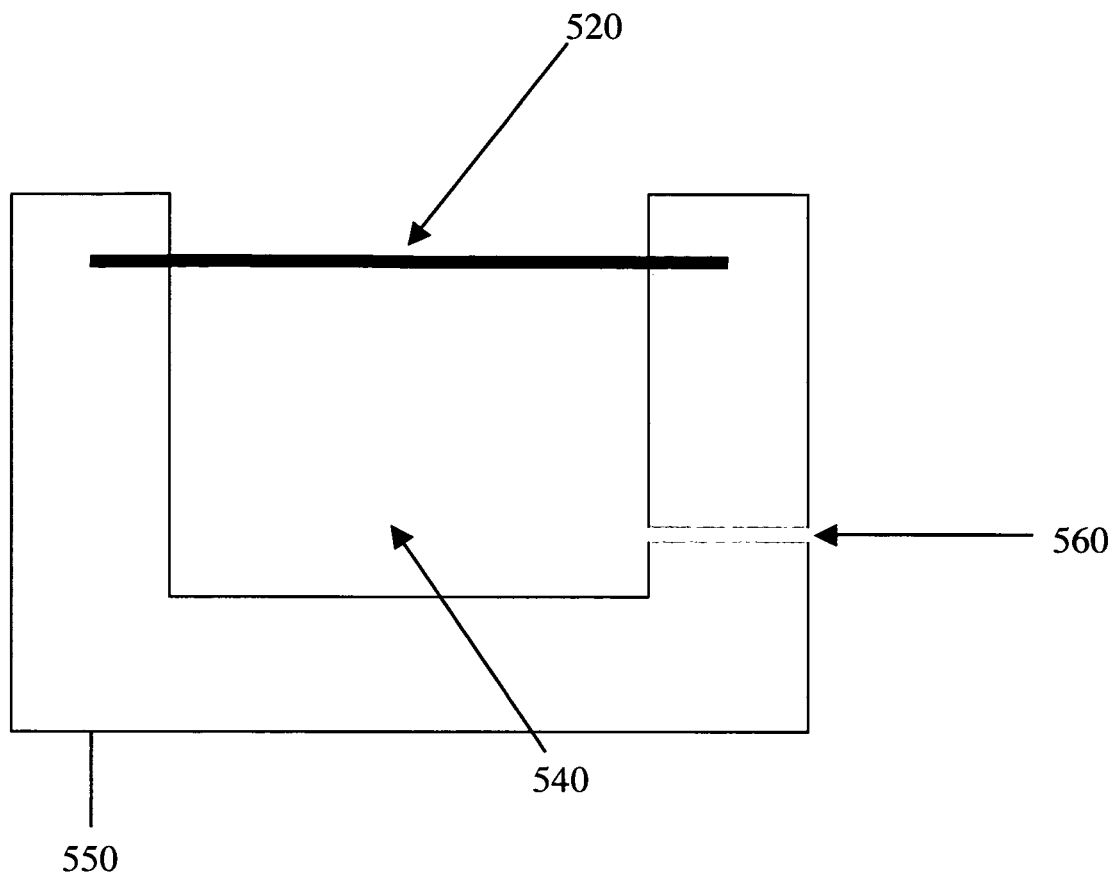
FIG. 5 shows an example of a piezoelectric pressure transducer mounted over a cavity according to the present invention.

Preferably, a diaphragm with piezoelectric material 520, is mounted over a cavity 540 formed by walls 550, as shown in FIG. 5, so that changes in pressure on the top surface of the diaphragm relative to the pressure in the cavity cause a deflection in the diaphragm and strain in the piezoelectric material. This strain is converted into electrical energy by the transducer. Methods of forming such cavities are well known to a person of average skill in the art.

To maximize the amount of power that a piezoelectric pressure transducer will produce, the static tire pressure should be the same on both sides of the diaphragm, thus not causing deflection, whereas the alternating pressure oscillations should cause dynamic flexing of the diaphragm. In order to achieve this state, the cavity on the backside of the diaphragm shown in FIG. 5 cannot be completely sealed. It must have a one or more leaks or small openings 560 that allow for the background tire pressure to equalize on both sides of the diaphragm, while providing sufficient resistance for the faster dynamic pressure waves such that they do not immediately pressurize the cavity. Typical dimensions for small openings 560 that would give about 200 Hz resonance for a 1 cm diameter and 1 cm height cavity, i.e. an internal cavity volume of 0.8 ml, are 0.5 mm diameter and 1.4 mm depth or length. Transducer designs that take advantage of lower frequency signals would need different small opening dimensions, which are easily calculable from simple textbook equations.

Figure 6:
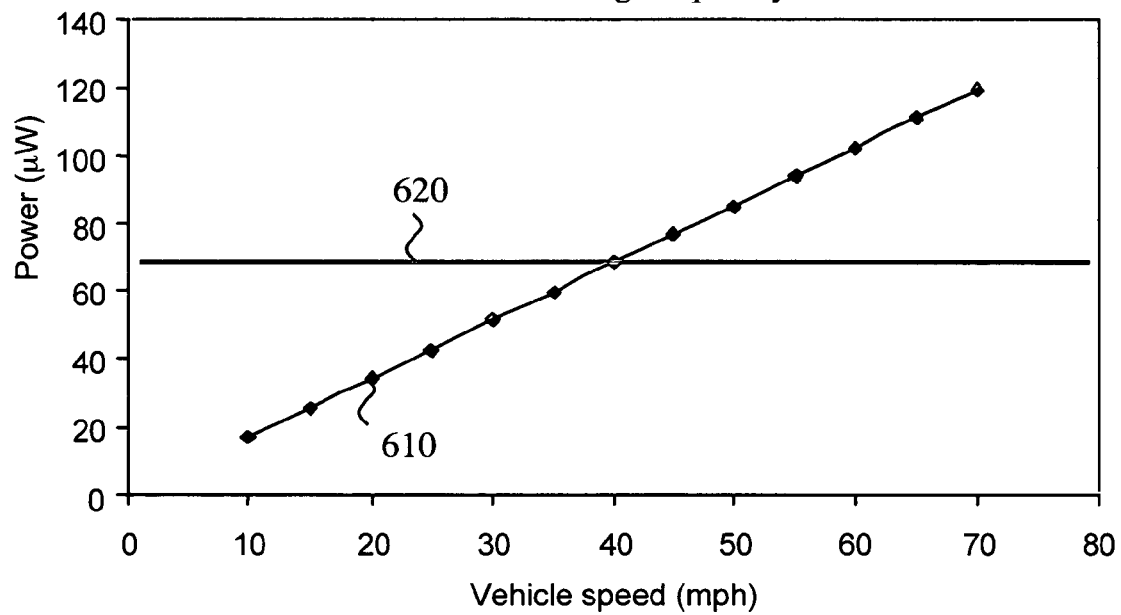
FIG. 6 shows an example of the power that can be generated from a piezoelectric pressure transducer vs. rolling frequency according to the present invention.

FIG. 6 shows an example of the theoretically estimated power available from a piezoelectric transducer, such as that shown in FIG. 4A, utilizing pressure changes attributed to the rolling frequency for a sample tire driving over a sample pavement at different speeds. The available power may be estimated by calculating the microstrain in a piezoelectric pressure transducer. The piezoelectric transducer used to estimate the power values shown in FIG. 6 has a radius of 10 mm, a thickness of 100 mm and a µstrain of 200, where a µstrain of 1 is equal to $10^{-6}$ relative elongation. The power available at different vehicle speeds is shown by black triangles 610. The average power generation of such a transducer (shown by solid line 620), 68 µW, is an eminently useable level for powering such systems as tire monitoring systems.

As mentioned above, in one embodiment of the invention, the transducer is tuned to have a resonance frequency at or very near 200 Hz, preferably between about 194 and about 206 Hz. Prasad et. al. (Prasad et al., "Two-Port Electroacoustic Model of an Axisymmetric Piezoelectric Composite Plate", 43$^{rd}$ AIAA/ASME/ASCE/AHS/AHC Structures, Structural Dynamics, and Materials Conference, 2002) have developed the following expression for the resonance frequency of a circular piezoelectric buzzer style diaphragm having an elastic layer and a piezoelectric layer.

$$f_s = \frac{1}{2\pi \sqrt{C_{AS} M_A}} \quad \text{Eq. 1}$$

where $f_s$ is the resonance frequency, $C_{AS}$ is the short-circuit acoustic compliance given by equation 2, and $M_A$ is the effective acoustic mass given by equation 3.

$$C_{AS} = \frac{\int_0^{R_2} w(r)\big|_{V=0} 2\pi r dr}{P} \quad \text{Eq. 2}$$

where $R_2$ is the radius of the elastic layer of the diaphragm (see FIG. 7A), r is the distance from the center of the diaphragm to a given point on the diaphragm, w(r) is the vertical displacement at r, and P is the applied pressure.

$$M_A = \frac{2\pi \rho_A}{\Delta V} \int_0^{R_2} (w(r))^2 r dr \quad \text{Eq. 3}$$

where $\rho_A$ is the area density of the diaphragm, and $\Delta V$ is volumetric displacement of the diaphragm.

Figure 7:
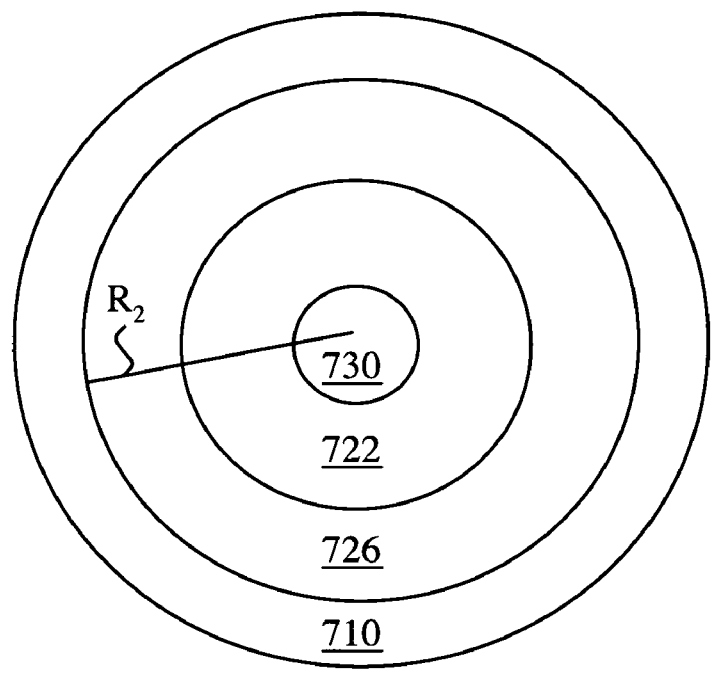
FIG. 7 shows an example of a buzzer-style piezoelectric pressure transducer tuned to a 200 Hz frequency of pressure change within a tire according to the present invention.
Figure 7:
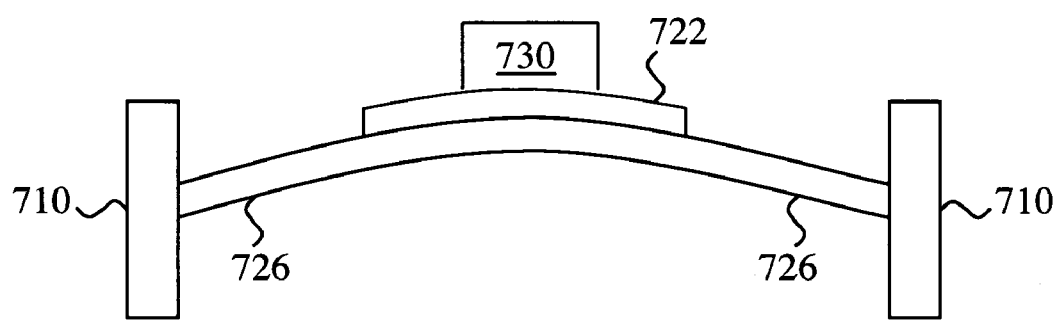

A circular piezoelectric diaphragm with dimensions shown in Table 1 has a resonance frequency of 265 Hz, which is significantly higher than 200 Hz. To achieve a resonance frequency of 200 Hz with materials that are commonly available in a size compatible with a tire monitoring system, it is necessary to add a small amount of weight to the center of the diaphragm. FIG. 7A is a top view of a circular piezoelectric diaphragm with a weight, and FIG. 7B is a cross section of this circular piezoelectric diaphragm. FIG. 7 shows clamp 710, piezoelectric layer 722, elastic layer 726 and weight 730. If a weight of 1 gram is added to the circular piezoelectric diaphragm transducer specified in Table 1, the resulting resonance frequency is approximately 200 Hz. The dimensions and weight can be slightly altered for wheels in which the acoustic pressure signal is not 200 Hz due to tire diameter. The appropriate weight to add to any given circular piezoelectric diaphragm can be determined using fine element simulation.

TABLE 1

Sample dimensions for a circular piezoelectric diaphragm transducer with resonance frequency near 200 Hz.

| | Value | Units | Description |
|---|---|---|---|
| $R_2$ | 24 | mm | Radius of brass elastic layer |
| $T_2$ | 50 | µm | Thickness of brass elastic layer |
| $R_p$ | 12.5 | mm | Radius of PZT-5H layer |
| $T_p$ | 50 | µm | Thickness of PZT-5H layer |

In previous work (Roundy and Wright, "A Piezoelectric Vibration Based Generator for Wireless Electronics", Smart Materials and Structures, Vol 13, 2004, pp. 1131-1142) it has been shown that piezoelectric structures used to scavenge electricity typically exhibit quality factors (Q) of 15 to 20 under load. The quality factor is a measure of how much the motion of the structure is amplified due to resonance. A structure that would deflect 1 unit under a non-resonant load will deflect Q units under a resonant load. Assuming the quality factor is a conservative 15, the calculated power output from the circular diaphragm device specified by Table 1 is about 4.2 mW for a vehicle driving at 30 mph.

While the circular piezoelectric diaphragm is a feasible solution, a similar level of power can be achieved from a smaller device using a spiral design as shown in FIG. 4B. A spiral piezoelectric diaphragm made of brass and PZT-5H with dimensions as shown in Table 2 has a resonance frequency of approximately 200 Hz (225 Hz). The resonance frequency can be easily adjusted by slight adjustments to the length without changing the overall size of the device. Assuming the same quality factor of 15, the calculated power output of this spiral diaphragm is about 3.4 mW.

TABLE 2

Sample dimensions for a spiral piezoelectric diaphragm transducer with resonance frequency near 200 Hz.

| | Value | Units | Description |
|---|---|---|---|
| L | 10.5 | mm | Edge length of total device |
| W | 1 | mm | Width of spiral element in diaphragm |
| $T_e$ | 100 | µm | Thickness of brass elastic layer |
| $T_p$ | 100 | µm | Thickness of PZT-5H layer |

Figure 8:
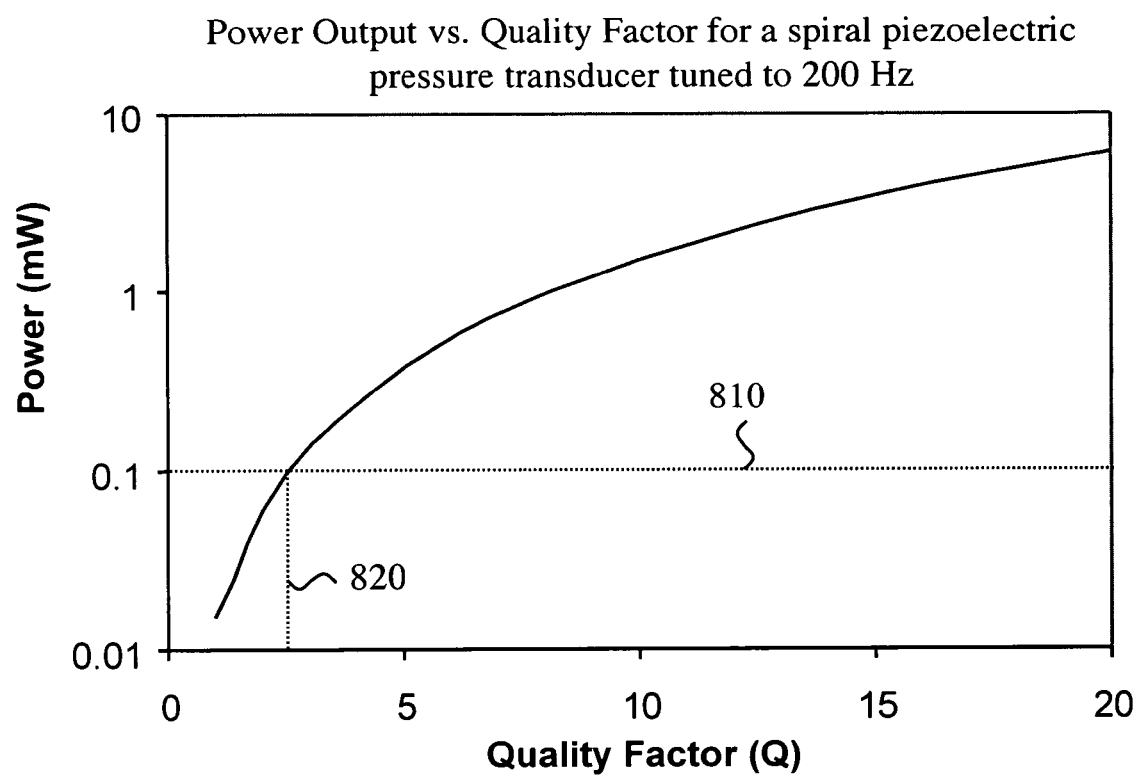
FIG. 8 shows an example of power output versus quality factor for a spiral design piezoelectric pressure transducer tuned to a 200 Hz frequency of pressure change within a tire according to the present invention.

FIG. 8 shows the calculated power output from the spiral design piezoelectric diaphragm transducer specified in Table 2 versus quality factor. One hundred microwatts (0.1 mW), shown by dotted line 810, is a conservative level of acceptability of power generation for a tire monitoring system. FIG. 8 shows that a quality factor of only about 2.5 (shown by dashed line 820) would be necessary to meet this level of acceptability.

Figure 9:
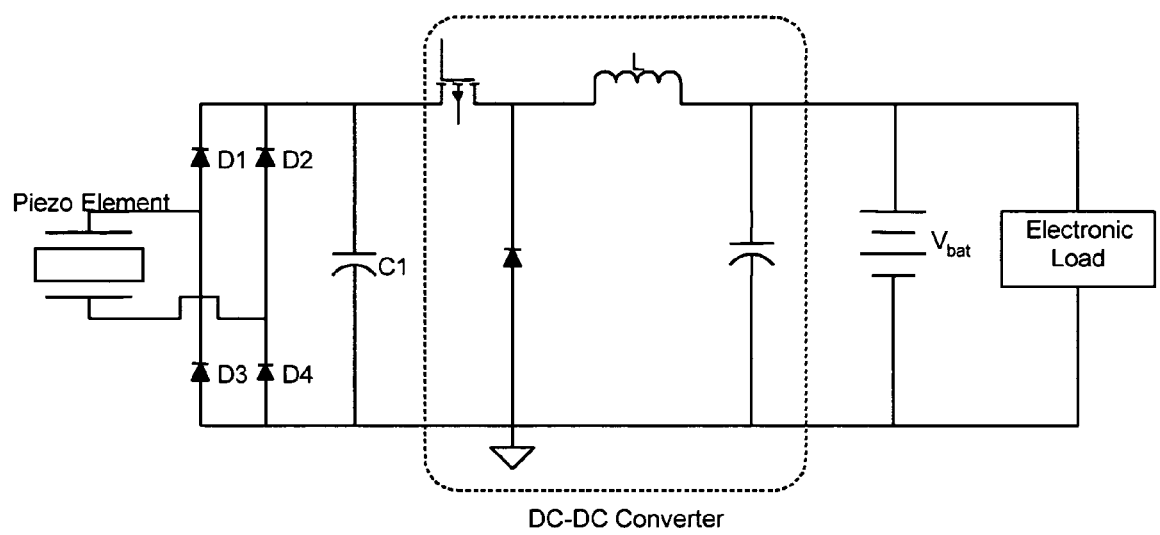
FIG. 9 shows an implementation of power circuitry for a piezoelectric pressure transducer according to the present invention.

As a person of ordinary skill in the art would appreciate, many different circuit implementations could condition the power generated by a piezoelectric pressure transducer to make it suitable for use by electronic devices. The primary functions that the power circuitry should preferably perform are: rectify and smooth the alternating piezoelectric voltage, store energy, convert the rectified voltage to the appropriate DC value, and supply enough peak current for transmission. One possible implementation of the power circuitry is shown in FIG. 9. The circuit shown in FIG. 9 contains a full-bridge rectifier (diodes D1-D4), a smoothing capacitor ($C_1$), a simple switched mode DC-DC converter, and a 3 volt rechargeable battery for energy storage. The battery should be selected properly in order to supply sufficient current for transmission, i.e. a battery with a footprint and thickness combination that allows for the maximum current draw that the electronics require. As shown in FIG. 9, the circuit may be constructed such that electrical energy is supplied to the electronic devices either directly from the DC-DC converter or indirectly from the battery. Other storage devices suitable for the invention include, but are not limited to, capacitors and rechargeable supercapacitors.

Variable Capacitor Transducers

Figure 10:
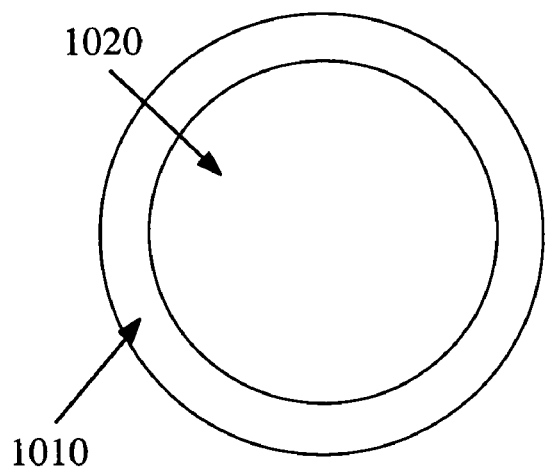
FIG. 10 shows an example of a dielectric elastomer pressure transducer according to the present invention.
Figure 10:
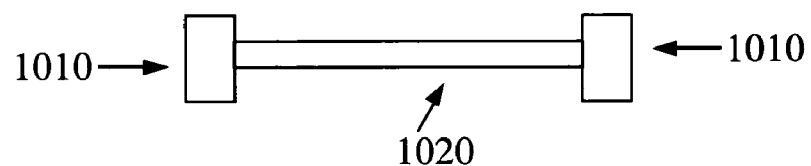
Figure 10:
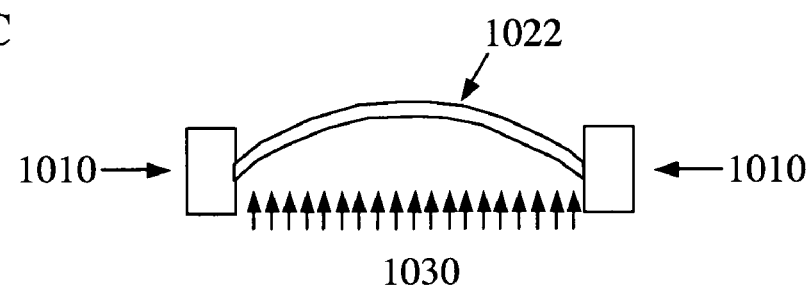

Two separate types of variable capacitor transducers may be useful for converting pressure changes generated within a tire into electrical energy. One embodiment uses a dielectric elastomer (also called electro active polymer or EAP) diaphragm (Pelrine et al., "Dielectric Elastomers: Generator Mode Fundamentals and Applications", Proceedings of the SPIE (Electroactive Polymer Actuators and Devices) from Smart Structures and Materials Symposium, 2001). The soft dielectric elastomer diaphragm deforms as a result of pressure changes generated within the tire. This mechanically induced dimensional change in turn causes a change in the capacitance of the dielectric elastomer diaphragm. This capacitance change can then be exploited to generate electrical power. A representation of this embodiment is shown in FIG. 10. FIG. 10A shows a top view of a dielectric elastomer pressure transducer, with frame 1010 and undeformed diaphragm 1020. FIG. 10B shows a cross section of a dielectric elastomer pressure transducer, with frame 1010 and undeformed diaphragm 1020. The undeformed diaphragm 1020 has thickness t and area A. FIG. 10C shows a cross section of a dielectric elastomer pressure transducer, with frame 1010 and deformed diaphragm 1022. The diaphragm is deformed by an alternating pressure wave indicated by arrows 1030. Deformed diaphragm 1022 has thickness t' and area A'. Capacitance is proportional to A/t. As deformed diaphragm area A' is greater than undeformed diaphragm area A, and deformed diaphragm thickness t' is smaller than undeformed diaphragm thickness t, A'/t'>A/t, such that the capacitance of the deformed diaphragm is much larger than that of the undeformed diaphragm.

The circuitry necessary for generating power from a mechanically induced capacitance change has previously been developed (Meninger et al., "Vibration-to-Electric Energy Conversion", IEEE Transactions on Very Large Scale Integration (VLSI) Systems, Vol. 9, No. 1, 2001, pp. 64-76; Sterken et al., "An Electret-Based electrostatic/spl mu/-generator", 12$^{th}$ International Conference on Solid-State Sensors, Actuators, and Microsystems, Vol. 2, 2003, pp. 1291-1294) in the context of vibration based generators. The same type of circuitry could be used in a tire pressure based generator.

Figure 11:
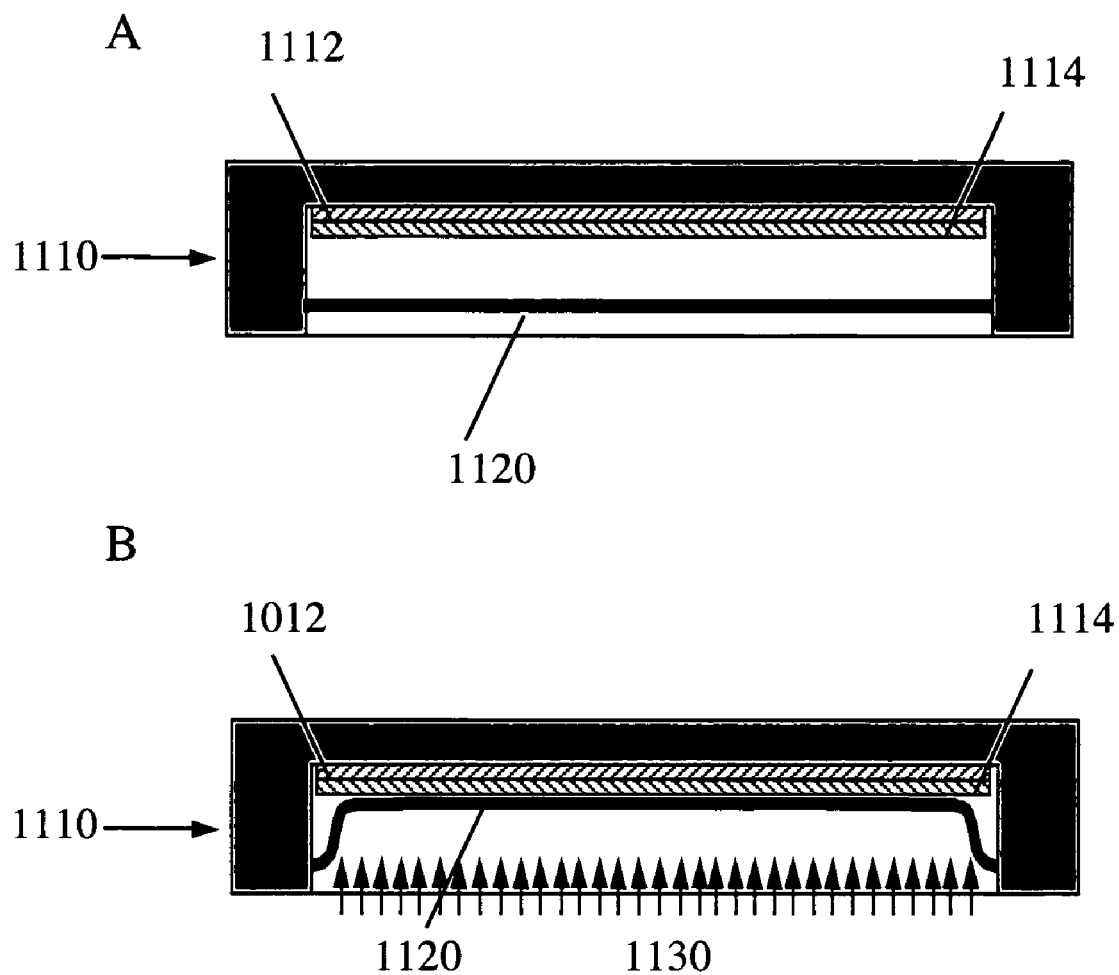
FIG. 11 shows an example of a variable air-gap capacitive pressure transducer according to the present invention.

A second embodiment of a variable capacitor transducer that may be useful as a pressure-based energy scavenger is shown in FIG. 11. In this embodiment, a rigid casing 1110 is used to create an air-gap variable capacitor between elastomer diaphragm 1120 and rigid casing 1110. This is different from the first embodiment in that the variable capacitor is not created by the dimensional change of the diaphragm, but by the changing gap between the diaphragm and the rigid casing. The surface of the diaphragm needs to be conductive. Likewise, the surface of the casing would be coated first with a conductive layer 1112, and then with an ultra-thin (approximately 100 nm) dielectric film 1114 to ensure that the conductive diaphragm never actually makes electrical contact with the conductive layer on the rigid casing. FIG. 11A shows a cross section of an undeflected variable air-gap capacitive pressure transducer. FIG. 11B shows a cross section of a variable air-gap capacitive pressure transducer in which diaphragm 1120 has been deflected by an alternating pressure wave indicated by arrows 1130.

It should be noted that the first and second variable capacitor transducer embodiments could be simultaneously incorporated in a single device. Furthermore, other potential pressure actuated variable capacitance structures could be employed. The power output from a variable capacitor transducer can be calculated and is of the same order of magnitude as that from the piezoelectric transducer.

Figure 12:
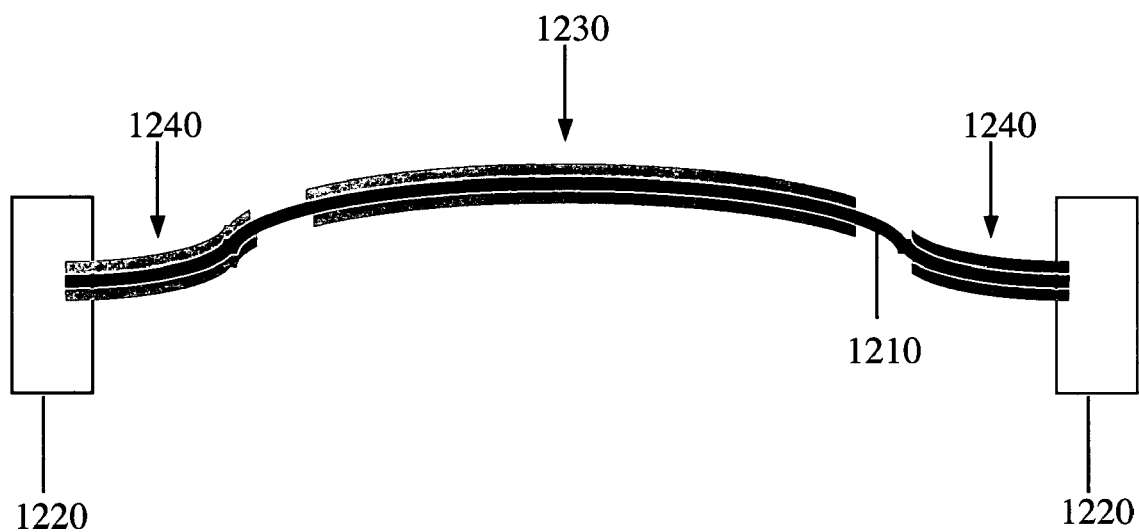
FIG. 12 shows an example of how transducer output may be optimized by means of modifying electrode configurations.

It is possible to maximize the output of piezoelectric transducers by arranging for the electrodes on the transducer surface to be constructed so as to provide electrical signals that are additive rather than subtractive. An example of this maximization is depicted in FIG. 12, which illustrates a cross section of a transducer according to the invention. Diaphragm 1210 does not deform in a uniform hemispherical manner. Instead, because the edges of the diaphragm are clamped by clamp 1220, its movement is constrained, resulting in opposing stresses in the diaphragm. By constructing a transducer with a central circular electrode 1230 and outer, oppositely poled, annular electrodes 1240, the opposing stresses can both provide a positive signal, enhancing the overall output.

Tire Monitoring System

The pressure-based power scavenger can be used in association with a micro-battery, capacitor, or rechargeable supercapacitor to store excess power. The scavenger can be fitted separately from a tire monitoring system within a wheel of a vehicle. Alternatively, it can be integrated with other parts of a tire monitoring system to form a single, self-powered unit that can, for example, be placed in a tire valve, an end cap of a tire valve, or a rim of a tire.

Figure 13:
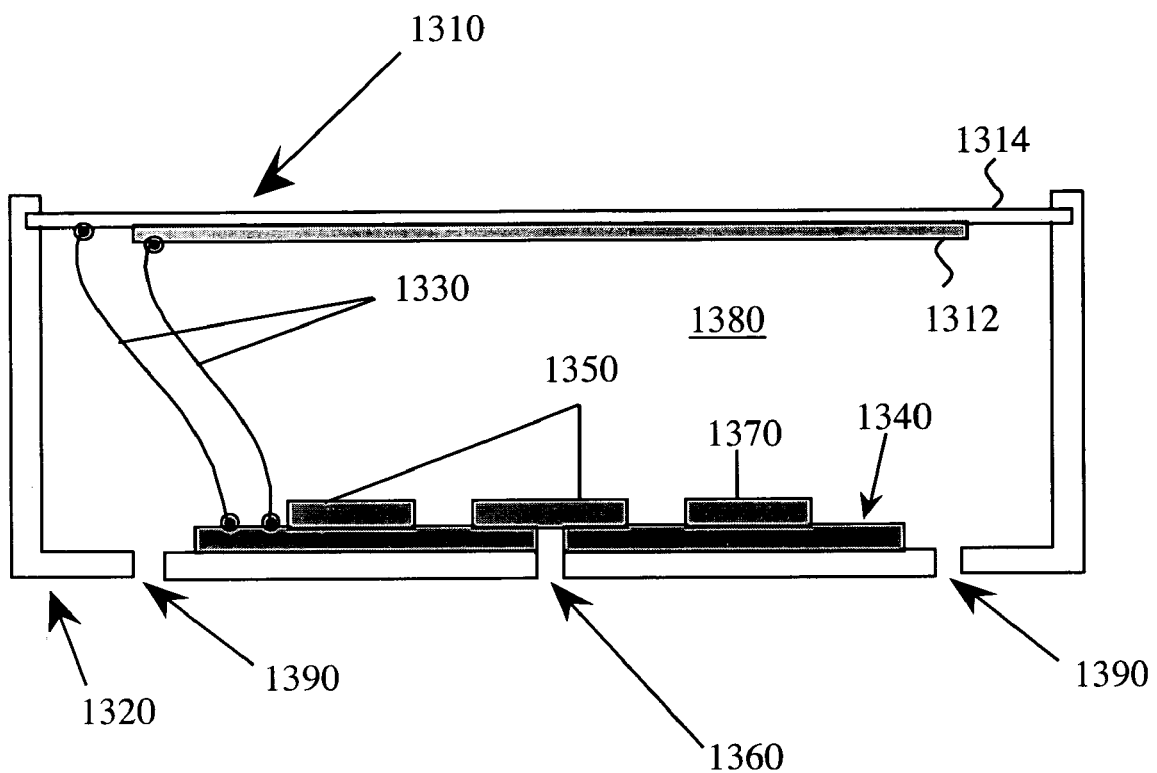
FIG. 13 shows an example of a tire monitoring system with a pressure transducer according to the present invention.

A system level implementation of a pressure based energy scavenger integrated with a tire monitoring system is shown in FIG. 13. In this implementation, a piezoelectric transducer structure 1310, containing piezoelectric material 1312 supported by diaphragm 1314, is integrated into a package 1320. The piezoelectric transducer structure 1310 is connected by wires 1330 to a printed circuit board 1340. The circuit board contains one or more electronic devices 1350 (two are shown), such as a pressure sensor, a temperature sensor, an acceleration profile sensor, and/or a tire wear monitor. While the scavenger could be implemented as a separate element on the printed circuit board 1340, this would limit its size and therefore power output. A package level implementation would be preferable as it will produce more power output. If the one or more electronic devices 1350 includes a pressure sensor, the package 1320 preferably includes a pressure port 1360. Preferably, the tire monitoring system also includes a storage device 1370, such as a battery, capacitor, or rechargeable supercapacitor, for storing the electrical energy converted by the transducer.

The piezoelectric transducer is preferably under static pressure equilibrium. Furthermore, if a cavity 1380 created by the package has an acoustic impedance that matches that of the piezoelectric transducer (in other words, they have resonance frequencies that are closely matched) the output of the transducer is improved. Preferably, the resonance frequencies would differ by less than about ±6 Hz. This is called a Hemholz resonator, and the concept is frequently used in piezoelectric buzzers. Therefore small openings 1390 in cavity 1380 are designed opposite to piezoelectric transducer 1310 to allow the static pressure to be the same on both sides of the diaphragm, and to create a Hemholz resonator. The resonance frequency of a cavity is well known, and is given by Equation 4.

$$f_r = \frac{v}{2\pi}\sqrt{\frac{n\pi r^2}{V\left(l+\frac{\pi r}{2}\right)}} \qquad \text{Eq. 4}$$

where V is the velocity of sound (344 m/s), n is the number of holes in the casing, r is the radius of the holes, l is the length of the holes, and v is the volume enclosed by the housing.

Note that the package casing itself could serve the function of the printed circuit board, and so this component could conceptually be removed. Furthermore, the electrical connections shown between the transducer and printed circuit board need not be free wires as shown, but could be metallized traces on the package which would improve reliability.

As one of ordinary skill in the art will appreciate, the present invention is not limited to or defined by what is shown or described herein. One of ordinary skill in the art will appreciate that various changes, substitutions, and alterations could be made or otherwise implemented without departing from the principles of the present invention. Accordingly, the scope of the present invention should be determined by the following claims and their legal equivalents.

What is claimed is:

1. A method of powering one or more electronic devices in a tire monitoring system, comprising:
    a) rotating a tire on a surface to generate pressure changes within said tire, wherein said pressure changes have a frequency in the range of about 1 Hz to about 100 Hz;
    b) converting said pressure changes into electrical energy with a transducer; and
    c) utilizing said electrical energy to power said one or more electronic devices in said tire monitoring system.

2. The method as set forth in claim 1, wherein said transducer comprises a piezoelectric transducer.

3. The method as set forth in claim 2, wherein said piezoelectric transducer comprises a piezoelectric material on a diaphragm.

4. The method as set forth in claim 3, wherein said piezoelectric material is square, circular, or spiral.

5. The method as set forth in claim 1, wherein said transducer comprises a variable capacitor.

6. The method as set forth in claim 5, wherein said variable capacitor comprises a dielectric elastomer diaphragm.

7. The method as set forth in claim 6, wherein said variable capacitor further comprises a rigid casing.

8. The method as set forth in claim 1, wherein said transducer further comprises a central electrode and an outer, oppositely poled, annular electrode.

9. The method as set forth in claim 1, wherein said transducer is a non-resonant transducer.

10. The method as set forth in claim 1, further comprising adding a weight to said transducer to alter the resonance frequency of said transducer.

11. The method as set forth in claim 1, wherein said one or more electronic devices are selected from the group consisting of a pressure sensor, a temperature sensor, an acceleration profile sensor, and a tire wear monitor.

12. The method as set forth in claim 1, wherein said pressure changes comprise gas pressure changes.

13. The method as set forth in claim 1, further comprising storing said electrical energy.

14. The method as set forth in claim 13, wherein said storing comprises storing said electrical energy in a rechargeable battery, a capacitor, or a rechargeable supercapacitor.

15. A tire monitoring system with a pressure-based energy scavenger comprising:
    a) one or more electronic devices, wherein said devices are selected from the group consisting of a pressure sensor, a temperature sensor, an acceleration profile sensor, and a tire wear monitor; and
    b) a transducer, wherein said transducer converts pressure changes generated from rotation of a tire on a surface into electrical energy, wherein said transducer operates at a frequency of between about 1 Hz and about 100 Hz, and wherein said transducer supplies said electrical energy to said one or more electronic devices to power said one or more electronic devices.

16. The tire monitoring system as set forth in claim 15, wherein said transducer comprises a piezoelectric transducer.

17. The tire monitoring system as set forth in claim 16, wherein said transducer comprises a piezoelectric material supported on a diaphragm.

18. The tire monitoring system as set forth in claim 17, wherein said piezoelectric material is square, circular, or spiral.

19. The tire monitoring system as set forth in claim 15, wherein said transducer comprises a variable capacitor.

20. The tire monitoring system as set forth in claim 19, wherein said variable capacitor comprises a dielectric elastomer diaphragm.

21. The tire monitoring system as set forth in claim 20, wherein said variable capacitor further comprises a rigid casing.

22. The tire monitoring system as set forth in claim 15, wherein said transducer further comprises a central electrode and an outer, oppositely poled, annular electrode.

23. The tire monitoring system as set forth in claim 15, wherein said transducer is a non-resonant transducer.

24. The tire monitoring system as set forth in claim 15, further comprising a weight for altering said resonance frequency of said transducer.

25. The tire monitoring system as set forth in claim 15, wherein said system is incorporated into a rim, valve cap, or valve stem of a vehicle tire.

26. The tire monitoring system as set forth in claim 15, wherein said pressure changes comprise gas pressure changes.

27. The tire monitoring system as set forth in claim 15, further comprising a storage device.

28. The tire monitoring system as set forth in claim 27, wherein said storage device comprises a rechargeable battery, a capacitor or a rechargeable supercapacitor.

29. A tire monitoring system with a pressure-based energy scavenger comprising:
   a) one or more electronic devices, wherein said devices are selected from the group consisting of a pressure sensor, a temperature sensor, an acceleration profile sensor, and a tire wear monitor; and
   b) a transducer, wherein said transducer converts pressure changes generated from rotation of a tire on a surface into electrical energy, wherein said transducer is selected from the group consisting of a spiral of piezoelectric material supported on a flexible diaphragm, a piezoelectric diaphragm comprising a weight for altering the resonance frequency of said piezoelectric diaphragm, and a variable capacitor transducer, and wherein said transducer supplies said electrical energy to said one or more electronic devices to power said one or more electronic devices.

* * * * *